(12) United States Patent
Chen et al.

(10) Patent No.: US 7,800,701 B2
(45) Date of Patent: Sep. 21, 2010

(54) SUB-PROGRAM AVOIDANCE REDIRECTION FOR BROADCAST RECEIVERS

(75) Inventors: Yen-Fu Chen, Austin, TX (US); John Hans Handy-Bosma, Cedar Park, TX (US); Nancy T. Sun, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/135,543

(22) Filed: Jun. 9, 2008

(65) Prior Publication Data

US 2009/0141168 A1 Jun. 4, 2009

Related U.S. Application Data

(63) Continuation of application No. 11/114,550, filed on Apr. 26, 2005, now Pat. No. 7,400,364.

(51) Int. Cl.
*H04N 5/44* (2006.01)
*H04N 5/50* (2006.01)

(52) U.S. Cl. .................. 348/731; 348/553; 348/558; 348/700; 348/725; 348/465; 725/38; 725/22; 725/32

(58) Field of Classification Search .......... 348/731, 348/732, 725, 729, 700, 558, 553, 460, 461, 348/465; 725/36, 22, 42, 38, 32, 25
See application file for complete search history.

(56) References Cited

U.S. PATENT DOCUMENTS

| | | | |
|---|---|---|---|
| 4,857,999 A | 8/1989 | Welsh | |
| 4,918,531 A | 4/1990 | Johnson | |
| 4,979,047 A | 12/1990 | Wine | |
| 5,151,788 A | 9/1992 | Blum | |
| 5,343,251 A | 8/1994 | Nafeh | |
| 5,418,621 A | 5/1995 | Park | |

(Continued)

OTHER PUBLICATIONS

Abrahamian; "EIA-608 and EIA-708 Closed Captioning",retrieved on Feb. 22, 2010, pp. 1-4; retrieved from http://evertz.com/resources/eia_608_708_cc_pdf.

(Continued)

*Primary Examiner*—David L Ometz
*Assistant Examiner*—Jean W Désir
(74) *Attorney, Agent, or Firm*—Robert H. Frantz; David A. Mims, Jr.; William H. Steinberg (57) ABSTRACT

A primary broadcast receiver is automatically tuned by a secondary broadcast receiver receiving a first broadcast signal corresponding to a source of an origin program by program transition detectors detecting monochrome interprogram dead frame or closed captioning for the hearing impaired text words according to user-specified tune conditions; by a tuner controller enabling the secondary broadcast receiver and a program transition detector to begin monitoring a first broadcast signal currently tuned by the primary broadcast receiver, while allowing tuning of the primary broadcast receiver by a user, and by automatically tuning the primary broadcast receiver to the first broadcast signal upon signal by the program transition detector that one or more of the user-specific tune conditions have been met.

21 Claims, 6 Drawing Sheets

U.S. PATENT DOCUMENTS

| | | |
|---|---|---|
| 5,668,917 A | 9/1997 | Lewine |
| 5,692,093 A | 11/1997 | Iggulden et al. |
| 5,696,866 A | 12/1997 | Iggulden et al. |
| 5,870,151 A | 2/1999 | Korber |
| 5,920,360 A | 7/1999 | Coleman, Jr. |
| 5,973,723 A | 10/1999 | DeLuca |
| 5,987,210 A | 11/1999 | Iggulden et al. |
| 5,999,688 A | 12/1999 | Iggulden et al. |
| 6,005,603 A | 12/1999 | Flavin |
| 6,100,941 A | 8/2000 | Dimitrova et al. |
| 6,133,910 A | 10/2000 | Stinebruner |
| 6,144,401 A | 11/2000 | Casement et al. |
| 6,449,021 B1 | 9/2002 | Ohta et al. |
| 6,469,749 B1 | 10/2002 | Dimitrova et al. |
| 6,591,420 B1 | 7/2003 | McPherson et al. |
| 6,593,976 B1 * | 7/2003 | Lord .................... 348/731 |
| 6,606,747 B1 | 8/2003 | Yuen et al. |
| 6,810,526 B1 | 10/2004 | Menard et al. |
| 6,898,762 B2 | 5/2005 | Ellis et al. |
| 6,993,245 B1 | 1/2006 | Harville |
| 7,007,234 B2 | 2/2006 | Hawkins |
| 7,043,746 B2 | 5/2006 | Ma |
| 7,089,575 B2 | 8/2006 | Agnihotri et al. |
| 7,161,637 B2 | 1/2007 | Strickland et al. |
| 7,167,632 B2 | 1/2007 | Cosmao et al. |
| 7,170,566 B2 | 1/2007 | McGee et al. |
| 7,190,415 B2 | 3/2007 | Iwamoto et al. |
| 7,266,701 B2 * | 9/2007 | Hayes et al. ................ 713/185 |
| 7,266,832 B2 | 9/2007 | Miller |
| 7,280,737 B2 | 10/2007 | Smith |
| 7,302,160 B1 | 11/2007 | Wells |
| 2003/0066077 A1 | 4/2003 | Gutta et al. |
| 2005/0028194 A1 | 2/2005 | Elenbaas et al. |
| 2005/0240967 A1 | 10/2005 | Anderson et al. |
| 2008/0052739 A1 | 2/2008 | Logan |

OTHER PUBLICATIONS

Caption Advantage; "Caption Advantage", retrieved on Feb. 22, 2010, pp. 1-5; retrieved from http://www.captionadvantage/Closed%20Captioning.html.

United States Patent Office; Examination Correspondence for Related Patent Application; retrieved on Mar. 1, 2010; U.S. Appl. No. 11/039,511,published by USPTO in Patent Application Information Retrieval (PAIR) in Image File Wrapper (IFW).

United States Patent Office; Examination Correspondence for Related Patent Application; retrieved on Mar. 1, 2010; U.S. Appl. No. 11/114,550,published by USPTO in Patent Application Information Retrieval (PAIR) in Image File Wrapper (IFW).

* cited by examiner

Example User Preferences

| User# 61 | UserName 62 | Detection Method 63 | Priority 64 |
|---|---|---|---|
| 1 | Jack | Method(1) [ <br> <subject=football> <and> <br> <volume_level> ] | Required <br> High |
| | | Method(2) [ <br> <calendar=wednesday> <and> <br> <time *after* 7:00PM > <and> <br> <time *before* 10:00PM > <and> <br> ( <timer=4x30> <or> <br> <volume_level> ) ] | Required <br> Required <br> Required <br> High <br> Low |
| ••• | ••• | ••• | ••• |
| N | Jill | Method(1) [ <br> <CC *contains* "breaking news"> <or> <br> <CC *contains* "special report"> <or> <br> <CC *contains* "laughter"> ] | High <br> High <br> Low |

Figure 6

SUB-PROGRAM AVOIDANCE REDIRECTION FOR BROADCAST RECEIVERS

CROSS-REFERENCE TO RELATED APPLICATIONS

Claiming Benefit under 35 U.S.C. 120

This application is a continuation of U.S. patent application Ser. No. 11/114,550, filed on Apr. 26, 2005, now U.S. Pat. No. 7,400,364 by Yen-Fu Chen.

CROSS-REFERENCE TO RELATED APPLICATIONS

None.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

The following publicly available documents are incorporated by reference into the present disclosure, including illustrations therein, wherein <dot>represents the period character in a web site address:
  (1) "Story Segmentation and Detection of Commercials In Broadcast News Video" by Alexander G. Hauptmann, et al., published at the "Advances in Digital Libraries Conference, Santa Barbara, Calif., Apr. 22-24, 1998.
  (2) "Audio and Video Processing for Automatic TV Advertisement Detection" by Seán Marlow, et al., published online at
  www<dot>eeng<dot>dcu<dot>ie.
  (3) "Commercial Detection/Recognition of TV Ads" by Prof. Dr. Rainer Lienhart, of Universität Augsburg, published online at
  informatik<dot>uni-augsburg<dot>de.

The related U.S. patent application Ser. No. 11/114,550, filed on Apr. 26, 2005, by Yen-Fu Chen, is incorporated by reference.

BACKGROUND OF THE INVENTION

1. Field of the Invention

This application is a continuation of U.S. patent application Ser. No. 11/114,550, filed on Apr. 26, 2005, by Yen-Fu Chen. This invention relates to automatic tuning of broadcast signal receivers.

2. Background of the Invention

Since the creation of the first broadcast television receiver ("TV"), many improvements and features have been made which enhance the entertainment value of TV use. These improvements have included addition of color to the image, higher resolution of the images, flattening of the screen, changes in technology for the display (e.g. from cathode ray tube to plasma and projection), and stereo and surround sound. Logical functions have been greatly improved and enhanced as well, such as addition of wireless remote controllers, clock and timer functions, automatic channel memory configuration, picture-in-picture display, etc. The TV has become a display for a number of other electronic systems, such as video tape players, digital versatile disk ("DVD") players, satellite and cable programming decoders and receivers, video games, and even personal computers.

Today, a TV user can view or watch (including audio) a selection of programming sources often ranging from 8 to 12 "local" "over the air" broadcast channels in most areas, to hundreds of satellite and cable broadcast channels, as well as several local device playback (e.g. DVD, VCR, etc.) devices, all at their fingertips. The variety of shows and programs which are now available 24 hours a day 7 days a week is overwhelming to comprehend for many users, so many systems of menus and program guides have been developed to help a user sort through all of the options, including organizing channels by content type or theme (e.g. news, sports, history, fashion, music, home and garden, etc.), and providing channel guide filters and locks based on audience ratings for programs (e.g. family, teen, adult, etc.). A user can even watch multiple channels at once using the picture-in-picture ("PIP") feature available on many TV sets, and can record parts of or entire programs while watching or not using a personal video recorder ("PVR"), such as a TiVo™ device.

All of these options, however, have led to new user habits and frustration. "Channel surfing" is a habit of changing channels rapidly over time in an effort to avoid commercials, watch multiple programs or keep track of multiple live events (e.g. tracking scores in 2 or more simultaneous sports events), or avoid boredom. For example, consider a hypothetical, but very realistic situation where a user, "Mike", is watching an Oakland Raiders National Football League ("NFL")™ football game. During a commercial break or during the half-time pause, Mike channel surfs. Mike continuously has to manually check back to see if the Raiders game is back on. There is no product or feature available to Mike, either part of the TV set or the cable/satellite receiver, which can automatically notify Mike when the commercial or half-time break is finished. In fact, the most common feature which can assist Mike is the "channel return" key available on most remote controls for TVs or receivers, which essentially tunes the receiver back to the last channel Mike was watching. Some remote controls, however, update this "last channel memory" value even when Mike uses the channel up or channel down keys on the remote control, so pressing the channel return key would not actually return him to viewing the source of the football game after surfing to several other channels. Additionally, Mike must manually decide when to operate the channel return key, which often results in frustration and a portion of missed programming (e.g. the game starts again but Mike doesn't check back until several seconds or minutes later).

Although PIP can be of use or assistance in such a situation, PIP can obscure the channel currently being watched. Additionally, there is a time gap or delay between when Mike sees his primary program is back on and when he can press the right buttons on his remote to return and disable PIP. Furthermore, if Mike doesn't want to return when back from commercial, but rather when some known segment appears (such as sports highlights in local news), then the limitations of PIP are multiplied.

BRIEF DESCRIPTION OF THE DRAWINGS

The following detailed description when taken in conjunction with the figures presented herein present a complete description of the present invention.

SUMMARY OF THE INVENTION

The present invention provides a user-configurable "surf return" function to an enhanced broadcast tuner, receiver or decoder for reception of video and audio signals such as, but not limited to, cable television broadcasts, satellite television broadcasts, over-the-air television broadcasts, multimedia broadcasts via computer networks, cable audio program broadcasts, satellite audio program broadcasts, and over-the-air audio program broadcasts.

According to a first aspect of the present invention, the surf return function allows detection of a sub-program such as commercials and automatically returns users to origin when the sub-program ends, thereby allowing the user to tune to alternate programming during the interim time period.

According to another aspect of the present invention, the surf return function provides a systematic way to help users avoid wasting time and energy by checking back repeatedly and periodically between multiple channels to ensure sub-program(s) has ended, etc.

According to another aspect of the present invention, the logic of the invention employs a clock or timer to allow the user to specify return to the original channel within a certain time period or at a certain time.

Using the invention, users or listeners do not need to hassle with "flipping" channels back and forth while waiting for a sub-program such as commercials to end, and broadcasters are allowed to give their customers the maximum ability to obtain entertainment. Additionally, users and listeners may elect to watch shows or listen to programs without being bombarded by constant interruptions and endless marketing tactics.

For example, a user may initiate the invention to allow auto-detection of commercial breaks while the user watches a football game on a first or original channel. When the commercial comes on, the user channel surfs, changing the channel or signal source to one or more alternate programs. When the advertisement ends or optionally when a certain time period has elapsed, the invention automatically tunes the tuner back to the original channel or channel source to return to watching the football game.

In a second example, a user may be interested in learning more about a specific news story that was reported (or has been previewed or announced to be upcoming) on his or her favorite news service. With the present invention, the user does not have to wait patiently through many other news reports and/or advertisements to view the story of interest, but instead can configure the invention to automatically tune the receiver to the news broadcast at the time the story airs. During the interim, the user may surf to other channels or other signal sources.

DETAILED DESCRIPTION OF THE INVENTION

The present invention will be described in the following paragraphs in terms of one available embodiment of a television receiver/tuner/decoder suitable for receiving audio and video signals from "free" or "over-the-air" transmitters, as well as closed-circuit and subscription types of broadcast signals such as cable TV and satellite TV. It will be recognized that the present invention may alternately be realized to receive other types of audio and video broadcast signals including but not limited to over-the-air radio programs; satellite "radio" programs (e.g. XM™, Sirius™, etc.); and Internet or wireless handset video, audio and multimedia programming (e.g. digital movies, Macromedia's Flash™ objects, streaming audio, streaming video, audio objects, WAV files, MPG files, MP3 files, etc.).

Likewise, the invention may be realized in any suitable form including, but not limited to, enhancements of television tuners, radio tuners, satellite decoders, cable decoders, web browsers, wireless handsets, and pervasive computing devices (e.g. personal digital assistants, laptop computers, etc.). Additionally, the present invention is not restricted to automatically returning the tuning control to an original channel, but may also be configured to return to a non-broadcast signal source, such as a local DVD player or local VCR player. Throughout the remainder of this disclosure, we will refer to the various types of human operators of broadcast receivers, such as TV users, web browser users, radio listeners, etc., collectively as "users".

Further, we will collectively refer to technologies and signal types for one-to-many transmissions (e.g. one station to many receivers, one web server to many web browsers, etc.), and point-to-point transmissions (e.g. peer-to-peer exchanges, two-party audio and/or video calls, etc.), as well as "live", "real-time", "on-demand" and "taped delayed" transmissions collectively as "broadcasts" for the purposes of the present disclosure.

Architecture of Enhanced Television Receiver/Tuner/Decoder

Figure 1:
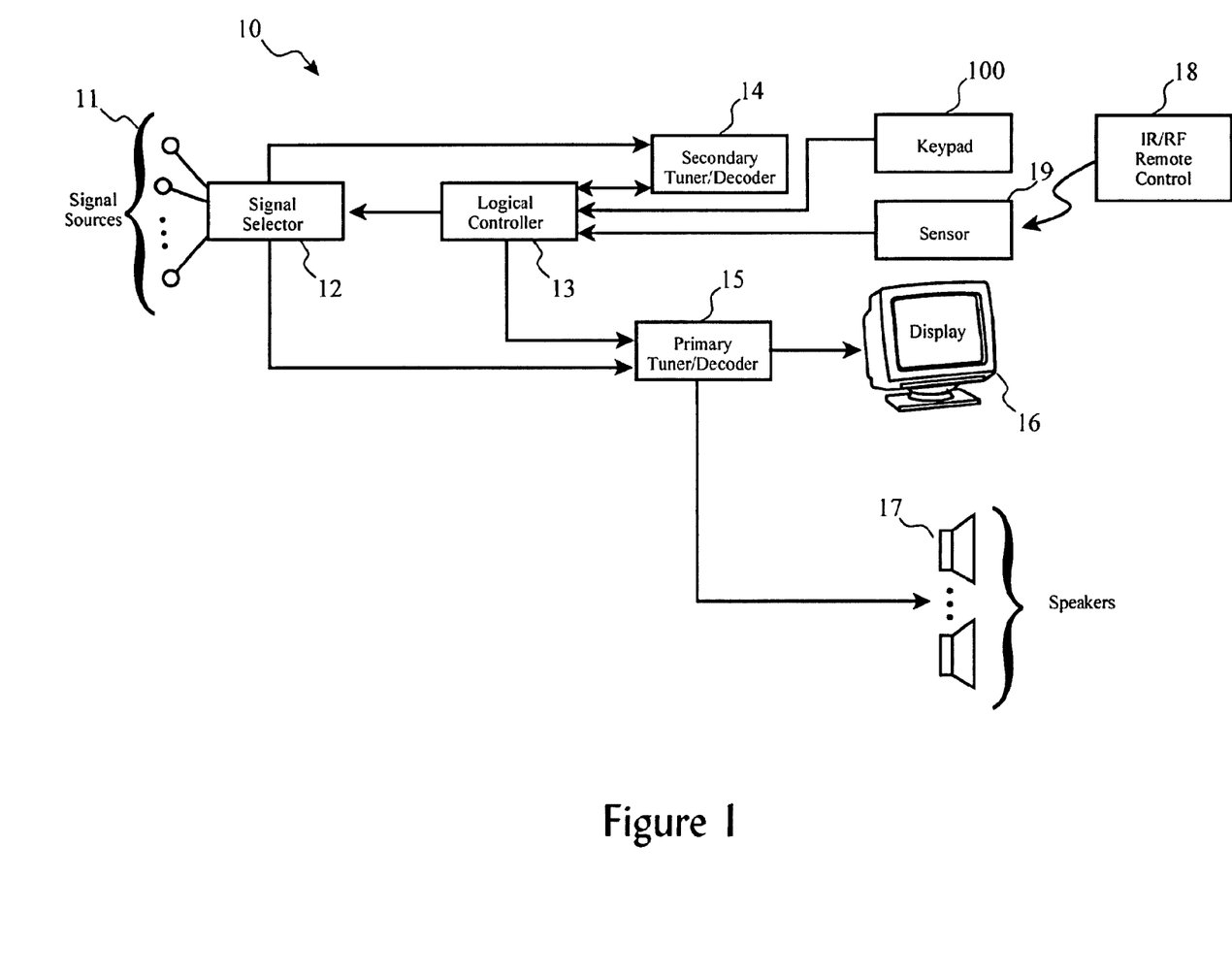
FIG. 1 shows the architecture of an enhanced broadcast tuner, receiver or decoder according to the present invention.

A TV embodiment preferably employs two tuners, a primary tuner (15) and a secondary tuner (14), as shown in FIG. 1. The primary tuner functions essentially the same as those of existing TV receivers, receiving commands from a logical controller (13) to tune or decode a specific frequency or channel for display (16) and audio presentation (17). A remote control (18) such as an Infrared ("IR") or Radio Frequency ("RF") remote control may be used by the user to command the logical controller, via a remote control sensor (19), to affect changes to the primary tuner in the typical manner (e.g. channel up, channel down, volume up/down, system on/off, direct channel access, closed captioning on/off, mute, etc.). The user may also command the primary tuner to receive one of a variety of signal sources (11) such as DVD, satellite receiver, cable box, VCR, video game, etc., using the remote (18), or using a keypad (100) on the front of the TV set.

A secondary tuner/decoder (14) is incorporated in the system of the preferred embodiment. This secondary tuner (14) is used to monitor the content or program status of the original channel or signal source while the user "surfs" alternate channels and signal sources using the primary tuner (15). The secondary tuner may be integral to the TV, it may be an accessory, or it may be an external unit. Some examples of external or accessory secondary tuners which may be employed in some embodiments are the tuners in VCR's, audio/video/home theater tuners/controllers, or tuners in over-the-air digital television ("DTV") set top boxes ("STB").

Figure 2:
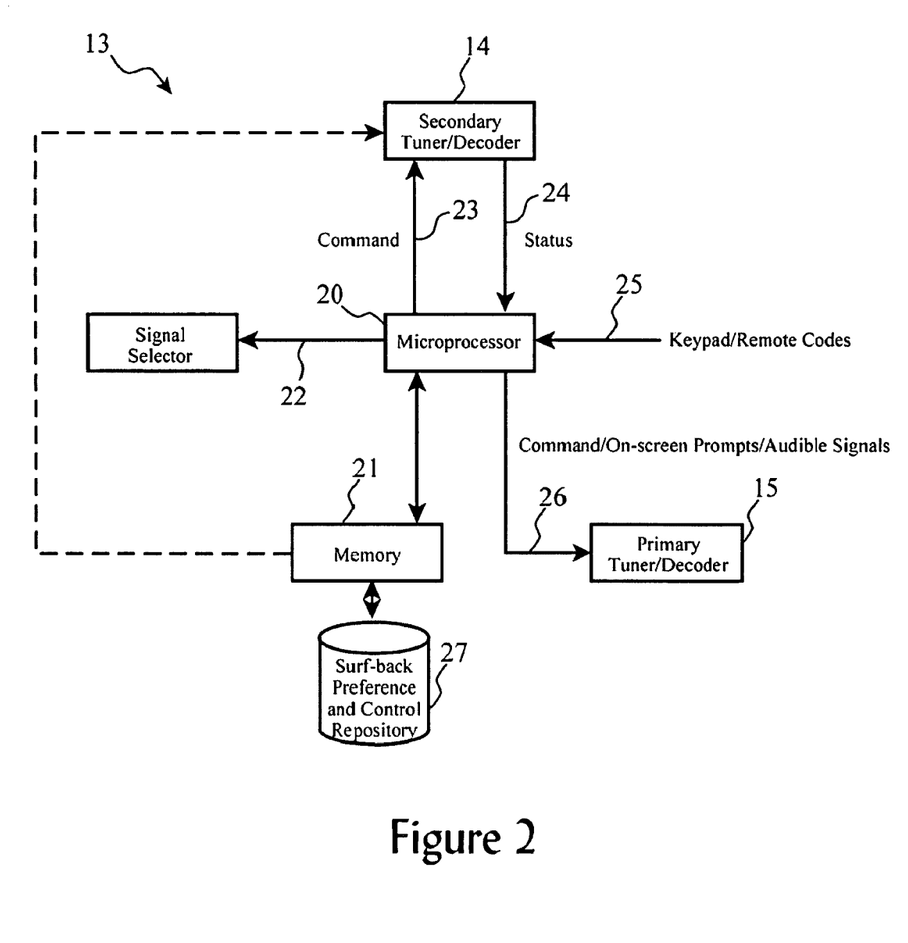
FIG. 2 illustrates a microprocessor or micro-controller-based embodiment of the control logic portion of an enhanced broadcast tuner, receiver or decoder according to the present invention.

Turning to FIG. 2, more details of the logical controller (13) portion of the invention are shown. According to a preferred embodiment, a microprocessor or microcontroller (20) is employed to implement certain control and user interface functions in firmware or software (e.g. downloadable features) stored in system memory (21). The controller (20) may command (26) the primary tuner (15) to tune or decode a specific channel or signal type, to adjust the volume and sound decoding type (e.g. monophonic, stereophonic, surround sound, mute, volume up/down, etc.), according to user inputs from the keypad and/or remote control. The controller may also issue certain prompts to the user using icons, text, images, and/or audio signals to the user via the primary controller for informational purposes (e.g. time display, channel display, source display, closed captioning text display), or to prompt the user for additional input (e.g. setup menus). According to all of these inputs and logical functions, the controller (20) commands (22) the signal selector in the traditional fashion of existing TV tuners.

The controller is also adapted to control the secondary tuner/decoder (14) using commands (23), to receive status indicators and signals (24) from the secondary tuner/decoder (14), and to command (22) the signal selector to route a particular signal source to the secondary tuner to allow the proper monitoring of program transitions, according to the invention. Additional logical functions are preferably implemented and stored in the memory (21), as will be described in more detail in the following paragraphs, including one or more user preferences for control of the invention (27). In a preferred embodiment, the memory comprises at least in part a "writeable" or modifiable type, such as FLASH-ROM, or removable media such as a SIMM card, to allow for feature updates, feature downloads, etc.

Surf-Back Logical Operations

Figure 3:
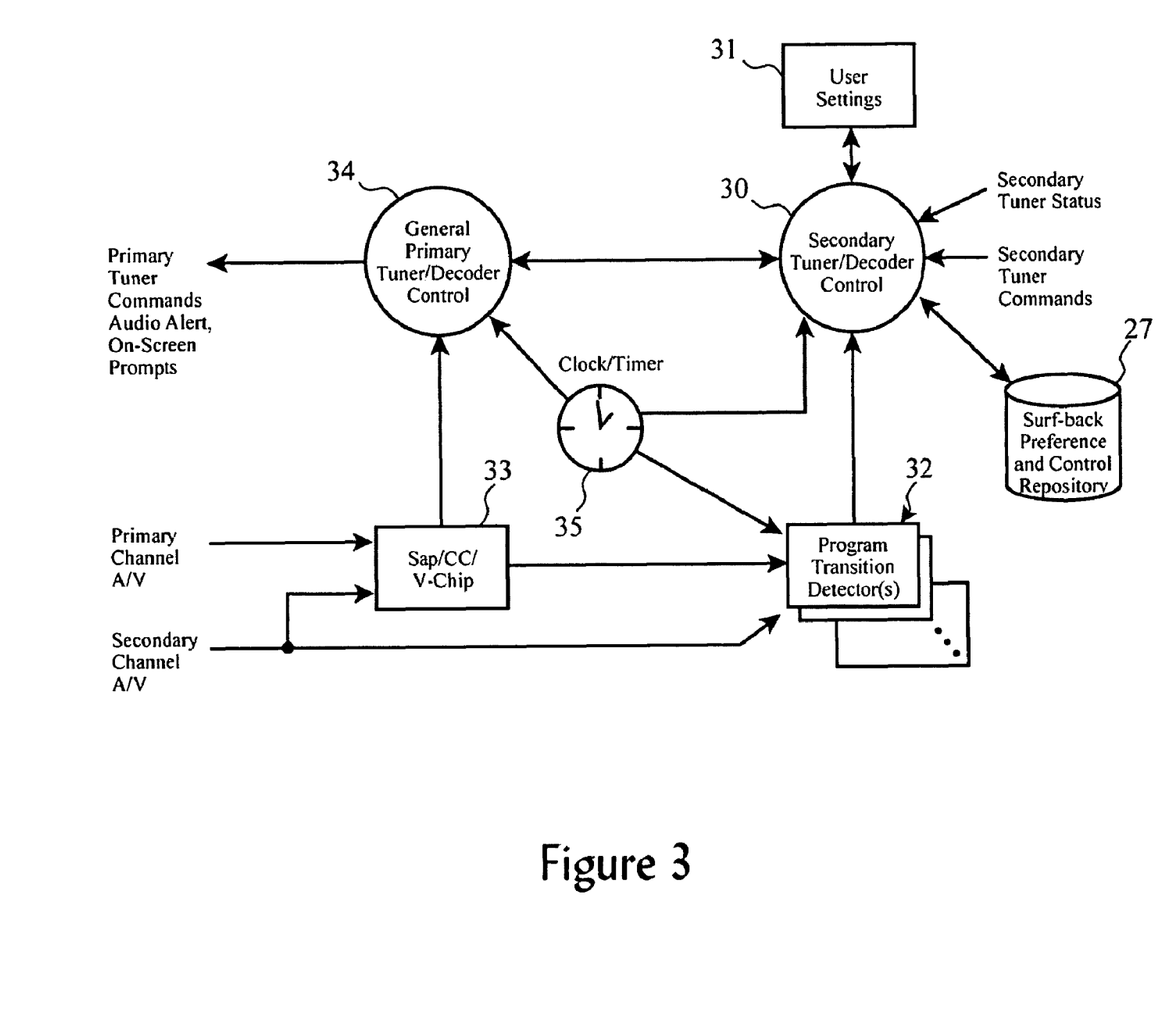
FIG. 3 sets forth a logical organization of functions of an enhanced broadcast tuner, receiver or decoder according to the present invention, preferably realized in part as software.

FIG. 3 depicts an arrangement of functions according to the present invention, preferably realized in software functions, but alternatively realized in hardware, circuitry, or a combination of circuity and software.

The primary control function (34) represents the traditional control functions of a TV tuner, with certain enhancements and modifications to integrate the secondary control (30) function. The primary control function is employed to allow the user to:

(a) select channel, signal source, volume, audio, and video options for viewing and listening normally; and (b) to configure the primary tuner normally (e.g. favorite channel memory, language choice, clock setting, etc.)

Additionally, the primary control function allows the user to be prompted for user surf-back settings using text and/or iconic menus displayed on the TV as commanded by the secondary control function (30).

A secondary audio program ("SAP"), closed captioning for the hearing impaired decoder ("CC"), V-Chip, and clock/timer (35) are employed in some embodiments of the invention to assist with program transition detection, as described in more detail in the following paragraphs.

The secondary control function (30) embodies the logical control processes to configure the secondary tuner to receive and monitor and audio, video, and/or sub-data (e.g. CC) of a selected channel and/or signal source while the user "surfs" using the primary tuner. The secondary control function also configures one or more program transition detectors, preferably according to the user's settings (27), and receives a status or signal in return when a transition has been detected. Additionally, and according to a preferred embodiment, the secondary control function receives a signal from the clock/timer (35), which allows a basic surf-back function (e.g. return automatically in 30 seconds) or a maximum surf time limitation (e.g. return when program transition is detected or within 180 seconds, whichever is earlier).

The surf-back user preference repository (27) is preferably stored in local memory, as well, where one or more user's may store their surf-back options and choices.

According to another aspect of the preferred embodiment, a plurality of program transition detectors are provided to allow the user one or more options for determining when a surf-back operation is to be executed. These detectors may be provided initially with the system (e.g. pre-configured), they may be downloaded via a network (e.g. modem, Internet, broadcast signal, etc.), they may be installed using removable media (e.g. floppy disks, removable memory cards, etc.), or a combination of these methods.

Figure 4:
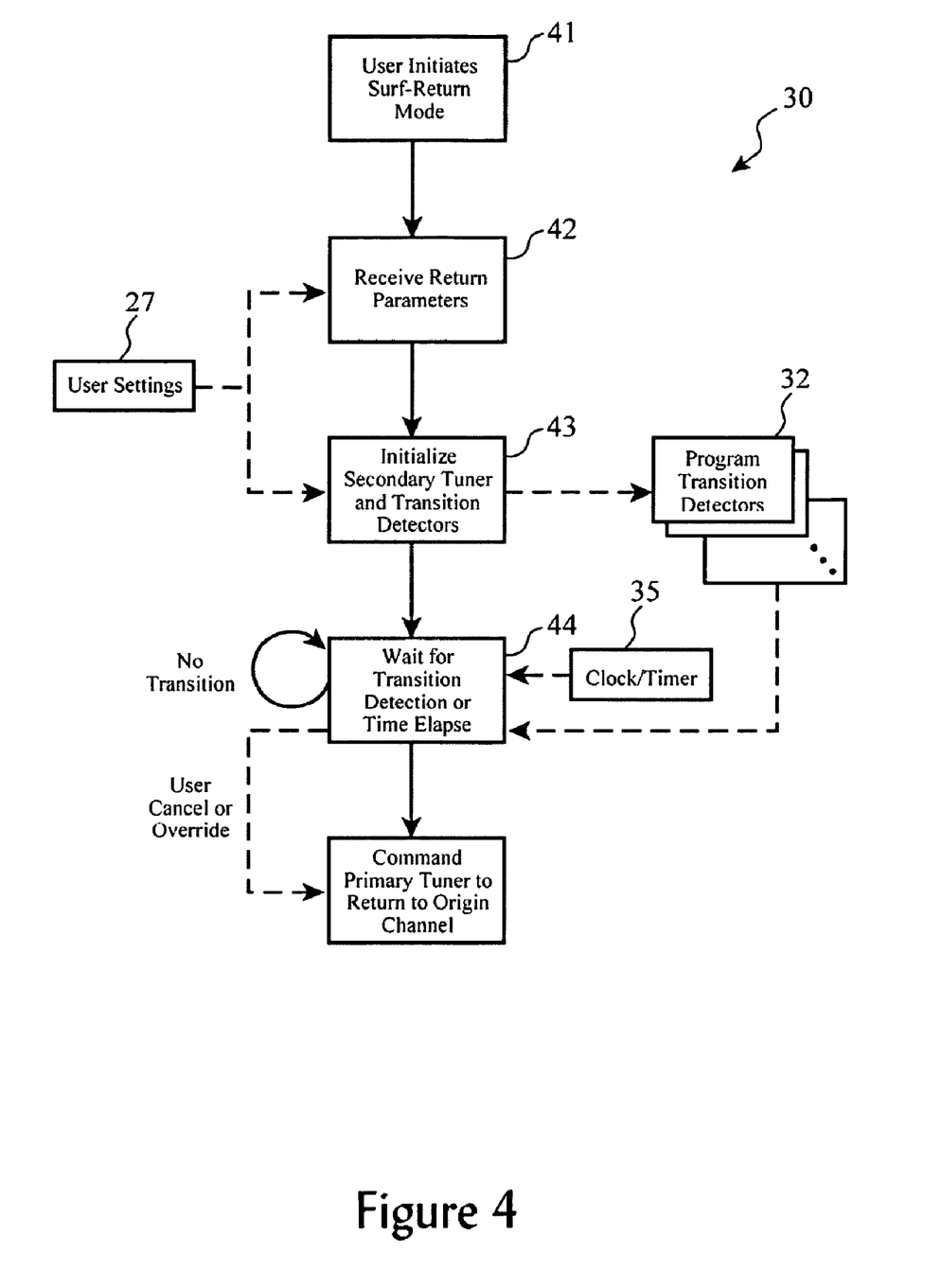
FIG. 4 shows a logical process according to the present invention.

Turning to FIG. 4, a logical process of the secondary control function (30) according to the invention is shown. First, the user initiates a "surf-back" function prior to leaving or tuning away from a program of primary interest, which we will refer to as the "origin" program. In practice, an origin program typically comprises a channel or frequency indicator coupled with a signal source indicator, such as (chan_3, satellite), (CNN, cable), or (input, DVD).

Next, the invention receives from the user certain parameters (42) controlling when the surf-back is to be automatically executed. Typically, this would include enabling or selecting one or more of the available detector types, and optionally setting a time limit for automatic return. The user is prompted for these choices using text, audio, icons, or graphics as previously described, and user input may be made through the keypad or remote control. Alternatively, the user may pre-configure one or more options of the user surf-back settings to allow for full or partial indication of the conditions under which the user would like to automatically return to the origin program.

The invention then initializes (43) one or more of the program transition detectors (32), sets a timer, etc., according to the user's parameters (42). This step includes commanding the secondary tuner to tune or decode the channel and source of the origin channel for monitoring by the detectors (32), thereby freeing the user to command the primary tuner/decoder to alternate channels, frequencies, and/or signal sources while "surfing" for alternate programs.

Until the clock/timer expires, or until a detector indicates a program transition has occurred on the origin channel, the invention waits (44) while allowing the user to "surf" other channels. If the user cancels the surf-back function, the timer/clock expires, or a program transition is detected, the primary tuner/decoder is commanded (45) to tune to the original channel, frequency and/or source, thereby effecting the surf-back function and returning the user automatically to the origin program under the conditions he or she specified.

Program Transition Detection

Figure 5:
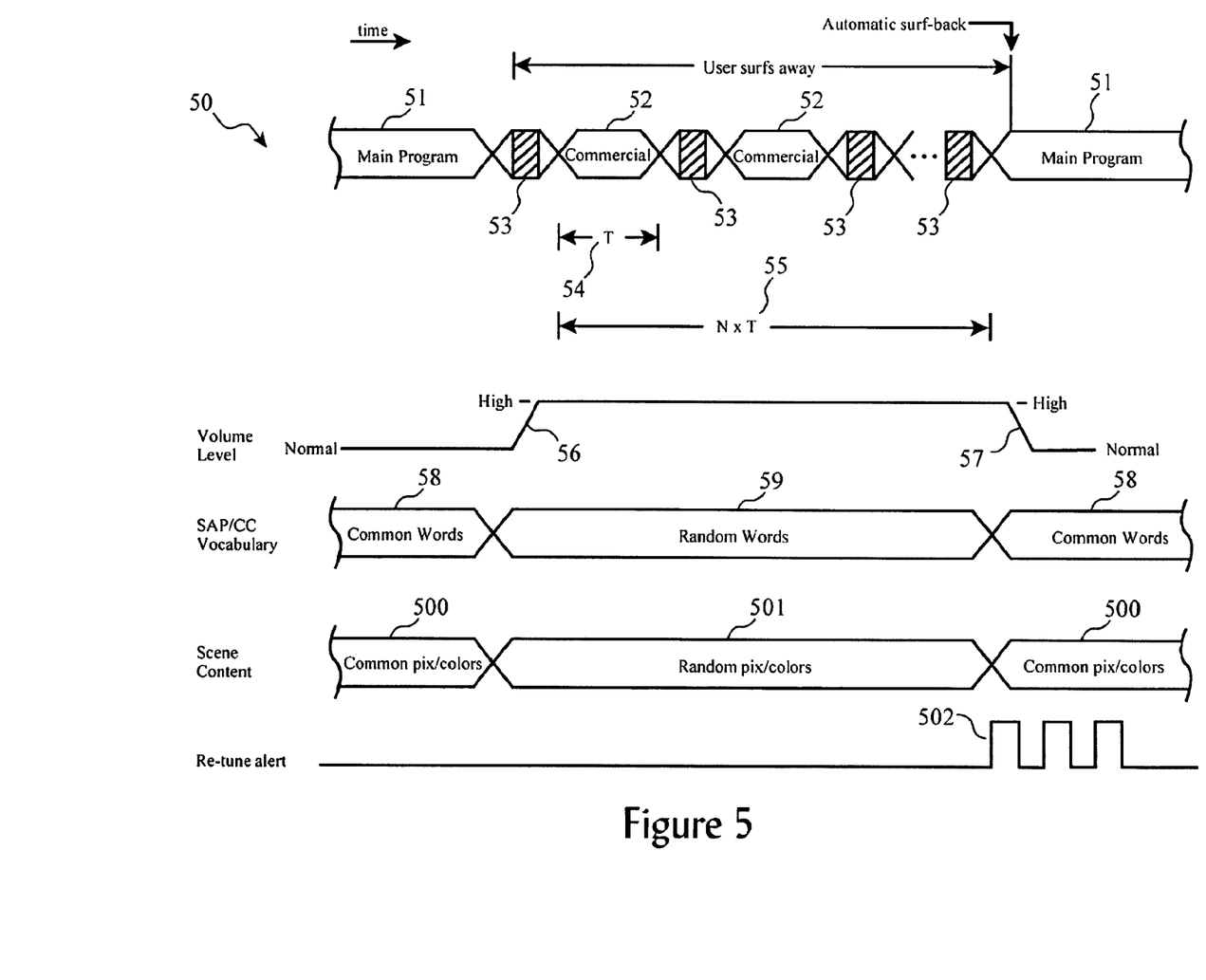
FIG. 5 illustrates several conditions which can be monitored to determine program transitions in a broadcast signal.

A number of methods and systems for detecting or determining changes in program content are available for embodiment in the present invention, some of which are illustrated in FIG. 5. As this number of available detection schemes is expected to continually increase, the present invention is organized in a manner to allow for the addition of, upgrade of, or deletion of new and old detectors over time. The following detection methods are incorporated into the preferred embodiment, and additional methods may be incorporated as they become available in the art:

(a) Timer-driven detector. Many commercials (52) are of a standard length, such as T=30 seconds, which allows the surf-back function to tune the primary tuner/decoder to the origin program (51) T seconds after activation (54).

(b) Multiple Timer-driven detector. Many commercials are of a standard length, such as 30 seconds, and often commercials are shown in groups of N, such as 4 commercials in a commercial break. This method allows the user to specify N (e.g. the number of commercials to avoid), so that the surf-back function tunes the primary tuner/decoder to the origin program T*N seconds (55) after activation.

(c) Volume change detector. Many commercials are transmitted with a significantly greater volume level than the main program in order to catch the attention of the users. By monitoring the volume level during the main program (e.g. while the user is tuned to the origin program and not surfing), and then monitoring the increased (56) volume level when the user activates the surf-back function, the surf-back function detects when the volume level returns (57) to that of the main program, which allows the surf-back function to automatically tune the primary tuner/decoder to the origin program.

(d) Sub-data processing. Sub-data includes text from closed captioning or SAP, as well as indicators from the V-Chip. By monitoring these data streams in the origin program during the main program of interest, one or more of the following can be determined:

(1) commonly used words (58) in the main program (e.g. "ball", "players", "field", "team" in a football game) which are not used in such great frequency during commercials (59); and (2) the content rating of the main program (e.g. adult words, V-Chip rating, etc.).

This allows the surf-back function to determine when a commercial is complete (e.g. the CC text returns to containing the vocabulary words ball, players, etc.), and to automatically tune the primary tuner accordingly. In alternative embodiment, such analysis can also be used to avoid or delay tuning back until certain conditions are met, such as the absences of adult words for a minimum period of time, which allows the user to surf-away during objectionable scenes or program segments and to automatically return when they are past.

(e) Word-Recognition. Using voice recognition technologies, words can be spotted in the audio portion of the signal, and further processed in a similar manner to the text words of the sub-data information.

(f) Image/Scene Analysis. Using image processing, transitions in scenery, especially background scenery, can be analyzed and used to detect a transition in programming. For example, while watching a football game, the center portion of the screen will contain a high content of green pixels (500), which will not be present (501) during most advertisements or during a half-time discussion segment.

(g) Cut-away Frame Detection. Due to limitations of transmission equipment and sequencing of advertisements, several monochrome frames (53) are usually transmitted following the completion of one program and prior to the start of another. These cut-away or inter-program dead frames occur between commercials, as well as between programs and commercials, and can be detected as program transitions, thereby allowing the surf-back function to automatically tune the primary tuner accordingly.

These are just a few examples of techniques and processes used to detect program transitions, especially in A/V signals and TV signals. The architecture of the present invention facilitates the incorporation of additional and new detectors as they become available, or as the user wishes to upgrade his or her system.

User Preferences

Figure 6:
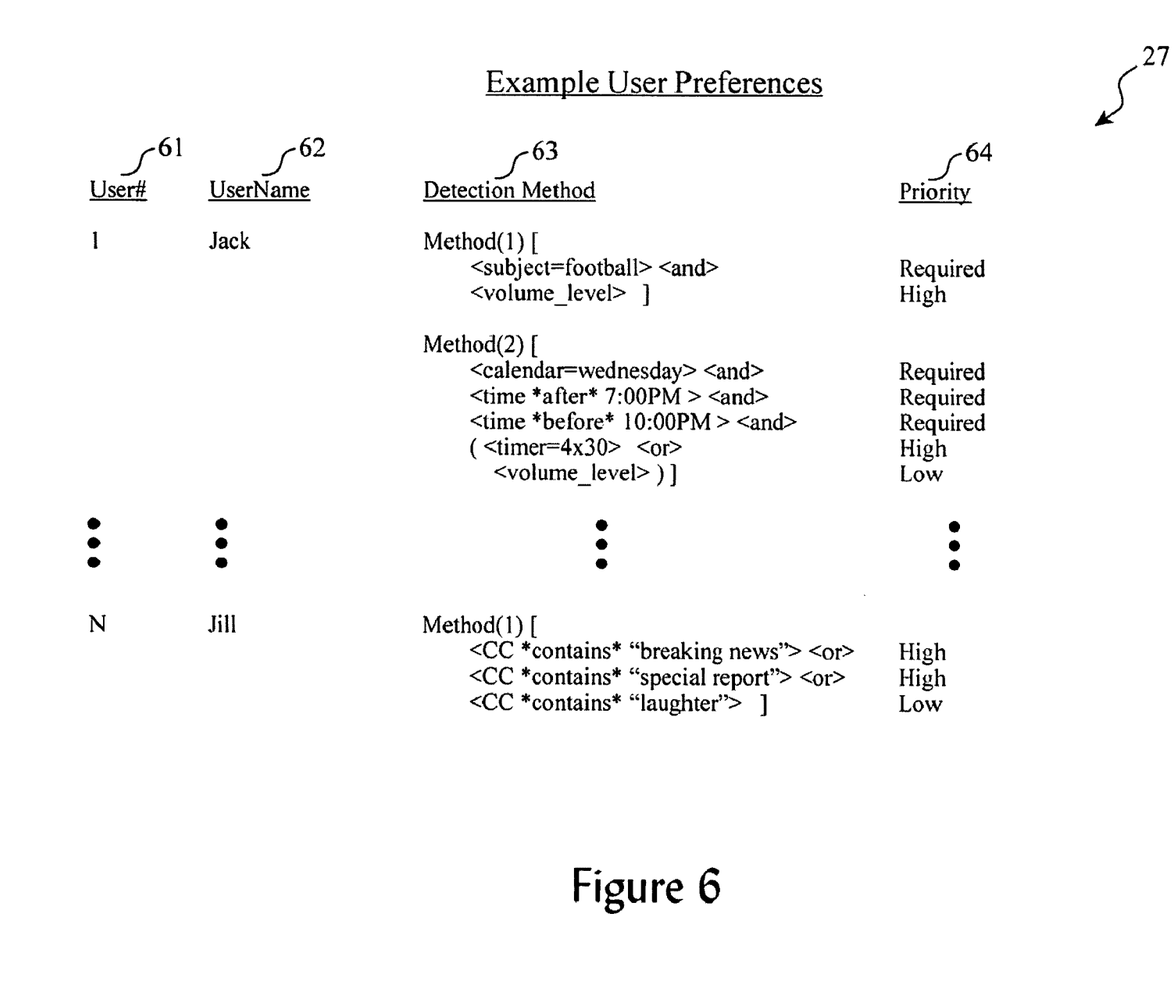
FIG. 6 provides an example of user preferences for the control of the processes and mechanisms of the invention.

FIG. 6 illustrates one possible embodiment of user preferences (27) which are preferably persistently stored in local memory of the controller. This example utilizes a format similar to eXtensible Markup Language ("XML") syntax, wherein square brackets "[" and "]" enclose top-level structures of statements, curved brackets "(" and ")" enclose logically grouped statements and parameters, and pointed brackets "<" and ">" enclose parameters and statements.

In this example, a number of user profiles (61) are defined, two of which are for user "Jack" and user "Jill" (62), which are names that are preferably set or chosen by each user. One or more detection methods (63) are logically grouped, such as Jack's first method, Method (1), which uses the volume level detection method during football games. Jack's second method, Method (2), uses a timer method for 4 commercials (e.g. 30 seconds), or a detection in volume level change. Also according to a preferred embodiment, a priority (64) can be set for each enabled detection method to resolve or override the status between multiple detection methods. For Jack's Method (2), certain "required" conditions allow that rule to be used or enabled only during his favorite Wednesday evening shows, for example, while placing high priority to returning to the origin program within 4 commercials, or when the volume level returns to normal.

The $N^{th}$ user in this set of example preferences is "Jill", who is a news fanatic, and she watches many comedy shows. So, during commercial breaks from her favorite news channel or comedies, she likes to surf other channels, but wants to return if any important news stories are broadcast, or if a comedy returns from break. So, her preferences enable the closed caption text analysis, looking for the words related to breaking news or to broadcast of a comedy show.

It will be recognized by those skilled in the art that these are only example preferences, and that many other combinations and logical rules are possible within the scope of the present invention.

User Notification of Surf-Back Operation

In a typical embodiment of the invention, the primary tuner would be tuned to the origin program automatically without further notice to the user. However, in certain conditions, the user may wish to receive an audible alert tone upon execution of the surf-back function. This can be done by inserting (502) into the audible sound of the TV a tone, sound, or verbal message, by the secondary control function, especially with a higher volume level than that of the origin or main program. For example, the user can activate the surf-back function, surf away for a while, and then leave the room to get a snack. When the surf-back function executes (e.g. when his main program is back on), the invention emits through the TV speakers a loud "beep-beep-beep", or verbal message "It's back on!".

CONCLUSION

The present invention has been described using examples of specific embodiments. It will be recognized by those skilled in the art that these examples do not represent the extent of the invention, as the invention may be realized an a number of varieties for a number of system and signal types. Therefore, the extent of the invention is determined by the following claims.

What is claimed is:

1. A system for automatically tuning a primary broadcast receiver comprising:
   a secondary broadcast receiver configured to receive a first broadcast signal corresponding to a source of an origin program;
   one or more program transition detectors selected from a group comprising a monochrome interprogram dead frame detector and a closed captioning for the hearing impaired text word detector;
   a set of user-specified tune conditions selected from a group comprising an enable selector for interprogram monochrome dead frames and one or more words for a closed captioning for the hearing impaired text word detector; and
   a tuner controller configured to, upon user activation, enable the secondary broadcast receiver and program transition detector to begin monitoring a first broadcast signal currently tuned by the primary broadcast receiver, to allow tuning of the primary broadcast receiver by a user, and to automatically tune the primary broadcast receiver to the first broadcast signal upon signal by the selected program transition detector that one or more of the user-specific tune conditions have been met.

2. The system as set forth in claim 1 wherein the broadcast receivers are television receivers.

3. The system as set forth in claim 2 wherein the program transition detector further comprises a fixed period timer.

4. The system as set forth in claim 2 wherein the program transition detector further comprises a timer configured to expire at a user-specified integral multiple of a fixed time period.

5. The system as set forth in claim 2 wherein the program transition detector further comprises a volume change detector.

6. The system as set forth in claim 2 wherein the program transition detector further comprises a vocabulary change detector.

7. The system as set forth in claim 6 wherein the vocabulary change detector is further configured to analyze words from a decoded Secondary Audio Program.

8. The system as set forth in claim 6 wherein the vocabulary change detector is further configured to analyze words recognized from an audio portion of the broadcast signal.

9. The system as set forth in claim 2 wherein the program transition detector further comprises detecting a change in a content rating indicator.

10. The system as set forth in claim 9 wherein the content rating indicator comprises a V-chip indicator.

11. The system as set forth in claim 2 wherein the program transition detector comprises a scene-based program segment detector.

12. The system as set forth in claim 2 wherein the tuner controller is further configured to select a signal source for enabling the secondary receiver to monitor, and to select a signal source for tuning the primary receiver.

13. The system as set forth in claim 1 wherein the tuner controller is further configured to insert an alert tone or message into an audible output of the primary receiver upon the tuning action.

14. The system as set forth in claim 1 wherein the receivers comprise satellite signal receivers.

15. The system as set forth in claim 1 wherein the receivers comprise at least one pervasive computing device.

16. The system as set forth in claim 1 wherein the receivers comprise at least one web browser device.

17. The system as set forth in claim 1 further comprising a detector installer for receiving and installing one or more additional program transition detectors.

18. The system as set forth in claim 17 wherein the detector installer comprises a removable computer media.

19. The system as set forth in claim 18 wherein the detector installer comprises a download receiver.

20. The system as set forth in claim 1 wherein the set of user-specified tune conditions comprises a plurality of tune conditions wherein each tune condition is associated with at least one user indicator.

21. The system as set forth in claim 1 wherein the set of user-specified tune conditions comprises a priority indicator for resolving the user importance of each condition in the evaluation of the conditions.

* * * * *